(12) United States Patent
Sikorski et al.

(10) Patent No.: US 6,221,795 B1
(45) Date of Patent: Apr. 24, 2001

(54) COMPOSITE MATERIAL AND PROCESS FOR MANUFACTURING SAME

(75) Inventors: Siegfried Sikorski; Michael Schober; Reinhold Schönacher, all of München (DE)

(73) Assignee: MTU Motoren-und Turbinen-Union Muenchen GmbH, Munich (DE)

( * ) Notice: Subject to any disclaimer, the term of this patent is extended or adjusted under 35 U.S.C. 154(b) by 0 days.

(21) Appl. No.: 08/954,199

(22) Filed: Oct. 20, 1997

(30) Foreign Application Priority Data

Oct. 18, 1996 (DE) ................................. 196 42 938

(51) Int. Cl.⁷ ..................... B32B 15/02; B32B 15/08; B32B 15/14; D03D 15/00
(52) U.S. Cl. ..................... 442/19; 442/8; 442/228; 442/229; 442/238; 442/377; 442/380
(58) Field of Search .................. 442/8, 19, 228, 442/229, 238, 377, 380

(56) References Cited

U.S. PATENT DOCUMENTS 5,759,658 * 6/1998 Piekos ..................................... 428/67

* cited by examiner

Primary Examiner—Blaine Copenheaver
Assistant Examiner—Christopher C. Pratt
(74) Attorney, Agent, or Firm—Evenson, McKeown, Edwards & Lenahan, P.L.L.C.

(57) ABSTRACT

The invention relates to a composite material having a substrate, which contains at least one fiber layer, and a cover layer, which adjoins the substrate and which, at least adjacent to the at least one fiber layer, contains metallic fibers and/or threads. The at least one fiber layer of the substrate and the metallic fibers and/or threads of the cover layer being saturated with binder and, as a result, the substrate and the cover layer are formed together or connected. Metallic, ceramic or glass-type particles are embedded in the cover layer in the area of the metallic fibers and/or threads. Preferably, the particles may be one or more or a combination of TiC, TiN, TiAl, Fe, steel, Ni, Si, metal alloys, diamond, or glass. In addition, the invention provides a process for manufacturing a composite material and articles of manufacture comprising the composite material, especially for rotor blades or propellers. The composite material and products comprising it display improved abrasion and erosion resistance and are protected from electrical damages.

27 Claims, 2 Drawing Sheets

COMPOSITE MATERIAL AND PROCESS FOR MANUFACTURING SAME

This application claims the priority of German patent application 196 42 983.8, filed Oct. 18, 1996, the disclosure of which is expressly incorporated herein by reference and which can be relied on to make and use aspects of this invention.

The invention relates to a composite material comprising a substrate and a cover layer. Metallic, ceramic or glass-type particles are embedded in the cover layer, which also comprises metallic fibers and/or threads. Furthermore, the invention relates to a process for manufacturing a composite material.

BACKGROUND AND SUMMARY OF THE INVENTION

Nowadays, numerous products and product parts are made of composite materials or composites. In order to achieve sufficient strength and stability under load while at the same time keeping the weight low, a fiber composite construction is often used. Under high mechanical loads, however, customary fiber composite parts have a low resistance to abrasion. This limits the durability of these composites and parts made of them.

Components, and particularly blades, made of a fiber-reinforced composite material, which are exposed to a fluid flow in turbo-engines, are particularly endangered by erosion because of abrasive particles in the fluid flow media and by thermal stress. For protecting power unit components, it is suggested, in German Patent Document DE-OS 43 43 904, to apply an erosion-resistant inorganic lacquer layer to the component. Although by means of this process the components can also be repaired, the permanence of the adhesion of the lacquer layer on the components presents a problem. Frequently, during the useful lifetime of the component, the application of the lacquer layer must be repeated.

As an alternative, German Patent Document DE-PS 42 08 842 discusses an erosion protection for helicopter rotor blades made of fiber-reinforced plastic materials. This is achieved through, at the critical points, a rotor blade being covered by a glued-on metal sheet, which is coated with particles of metal compounds. The problem of permanence of adhesion between the glued-on metal sheet and the composite fiber structure situated underneath also exists in this case.

A development by the inventors relates to a blade for a turbo-engine in which at least one blade exposed to the flow is constructed as a composite with layers of fiber-reinforced plastic material and with at least one metallic cover layer, which is applied to part of the surface or to the whole surface, as a protection against erosion. This cover layer has metallic fibers or threads, which are connected with the fiber-reinforced plastic material of the adjoining layers by way of the same synthetic resin binder. In addition, the blade may be coated, over part of its surface or over its whole surface, by an erosion-resistant protective layer, such as a temperature-resistant lacquer or a thermoplastic foil.

In addition to the erosion resistance because of the use of metallic fibers or threads in the cover layer, a tolerance to defects is also reached as a result of the plurality of mutually connected fibers or threads. As a further advantage, for example, in the case of local damage to the cover layer, the automatic spreading of the damage or a detaching of the cover layer is avoided, which may occur, for example, in the case of glued-on metal sheets as the cover layer, discussed above. The advantageous high adhesiveness of the cover layer on the substrate situated underneath is ensured by the joint synthetic resin binder, which connects the fiber-reinforced plastic layers and the cover layers to one another as well as with one another. Furthermore, the electric conductivity of the metallic fibers or threads results in a lightning protection, which is advantageous, for example, for rotor blades or propellers. However, it is desirable to further improve the resistance to abrasion and erosion of a correspondingly constructed composite for applications in the case of extremely stressed components.

For this purpose, the invention provides a composite comprising a substrate having at least one fiber layer, and a cover layer, which adjoins and which, adjacent to the at least one fiber layer, has metallic fibers and/or threads. The at least one fiber layer of the substrate and the metallic fibers and/or threads of the cover layer are saturated with binder or at least one binder composition so that, as a result, the substrate and the cover layer are formed and connected. The improvement of the abrasion resistance to composites constructed according to the present invention is achieved, inter alia, by embedding metallic, ceramic or glass-type particles in the cover layer in the area of the metallic fibers and/or threads.

Embedding particles, according to the invention, into the area of the metallic fibers and/or threads of the cover layer improves the resistance to abrasion. In addition and as another advantage, the added particles result in lower or higher coefficients of friction that can be adjusted in connection with such a composite depending on the application requirement. The electric conductivity of the cover layer is advantageously maintained because of the metallic fibers and/or threads therein. Furthermore, the abrasive behavior of this cover layer is improved in comparison to earlier constructions.

In preferred embodiments of the invention, it is provided that the substrate contains a plurality of fiber layers and/or is a fiber-reinforced plastic material and/or the at least one fiber layer of the substrate completely or partially contains non-metallic fibers.

Generally, in addition to one or several areas with/of metallic fibers and/or threads, the cover layer may also have other components or sections. The cover layer is preferably formed of a substantial amount of the metallic fibers and/or threads, and with the embedded particles and the binder.

Within the scope of another preferred aspect of the composites of the invention, it is provided that the fiber layer and the metallic fibers and/or threads of the cover layer are saturated and connected by means of the same binder. However, as a function of the usage demands of the composite, different binders can be used in the layers. For example, resin, particularly synthetic resin, is suitable for use as the binder or in binder compositions.

The metallic fibers and/or threads of the cover layer of the composite according to the invention may form a mesh and/or a woven structure. However, it is particularly advantageous for these fibers and/or threads to be present in the form of felt.

According to the desired characteristics of the cover layer, metallic, ceramic and/or glass-type particles can be used. In particular, the particles may contain TiC, TiN, TiAl, Fe, steel, Ni, Si, metal alloys, diamond, glass and compounds therewith as well as combinations thereof. With respect to their structural shape and geometry, the particles may be solid, porous or hollow.

In order to facilitate and optimize the introduction of the particles into the area of the metallic fibers and/or threads of the cover layer, it is advantageous for the particles to be components of a carrier medium which surrounds the metallic fibers and/or threads of the cover layer at least partially and/or directly. Such a carrier medium also promotes the distribution capacity and the adhesion of the particles in the area of the metallic fibers and/or threads of the cover layer. Preferred types of carrier medium are solder compounds, metal fillers, adhesive agents, such as bonding agents in particular, or thermoplastic materials.

For a distribution which is as uniform as possible and for a secure fastening of the particles in the area of the metallic fibers and/or threads of the cover layer, it is also advantageous for the particles to be completely or partially connected by means of the binder, optionally the carrier medium, by a mechanical clamping with the metallic fibers and/or the threads of the cover layer, by sintering or the HIP (hot isostatic pressing) process with the metallic fibers and/or threads of the cover layer. However, basically all suitable processes are available within the scope of the invention.

A further development of the composite according to the invention is characterized in that, in comparison to the substrate, the cover layer has a higher resistance to abrasion, a higher fire-proofing capacity and/or a higher electric conductivity. As a result, a cover layer can be used which is optimized according to the physical and chemical requirements.

In order to be able to implement the protection of the cover layer wherever it is required and in order to thus provide a particularly useful and durable composite, it may also be provided that the cover layer is constructed on several sides of the substrate. This embodiment will be particularly preferable if the cover layer surrounds the substrate at least essentially completely.

In addition, the invention provides a process for manufacturing the composites described, which can be used to provide components of improved resistance to abrasion and erosion, especially in the case of extremely stressed components.

This process relates to the manufacturing of a composite which contains a substrate, which has at least one fiber layer, and a cover layer which adjoins the latter and which contains metallic fibers and/or threads at least adjacent to the at least one fiber layer, the at least one fiber layer of the substrate and the metallic fibers and/or threads of the cover layer being saturated with binders and as a result the substrate and the cover layer being formed and connected.

Without being exclusively limited thereto, composites can be produced by means of this process which have the above-mentioned characteristics and the characteristics indicated throughout this disclosure.

According to the process, it is provided that particles are embedded into the cover layer in the area of the metallic fibers and/or threads before the at least one fiber layer of the substrate and the cover layer are saturated with a binder in the area of the metallic fibers and/or threads.

In contrast to the earlier development by the inventors, in the present process no attention has to be paid to an additional surface shaping or layer thickness of a separate protective layer on the otherwise finished composite, which simplifies the manufacturing process and lowers the corresponding expenditures.

Preferably, the particles are provided in a pasty or liquid carrier medium and for embedding the particles, at least in the area of the metallic fibers and/or threads, the cover layer is dipped into this carrier medium or this carrier medium flows through the cover layer.

According to a variant of this embodiment of the process according to the invention for manufacturing a composite, a liquid solution is used as the carrier medium, particularly an alcoholic or alcohol-like solution, such as ethanol. Before the saturation of the at least one fiber layer of the substrate and of the cover layer in the area of the metallic fibers and/or thread with binder, such a carrier medium is then removed while leaving particles on the metallic fibers and/or threads of the cover layer, which can be achieved by evaporating.

Another basic possibility of embedding the particles within the scope of the invention, concerning the metallic fibers and/or threads of the cover layer, consists of using a solder compound, a metal filler, an adhesive agent, particularly a bonding agent, or a thermoplastic as the carrier medium. In this case, during the saturation of the at least one fiber layer of the substrate and of the cover layer in the area of the metallic fibers and/or threads, the carrier medium together with the particles remains with the binder on the metallic fibers and/or threads of the cover layer and therefore forms an at least partial coating over the metallic fibers and/or threads of the cover layer. Preferably, such a carrier medium makes it possible that the correspondingly treated cover layer can still be shaped or adapted to shapes.

As a further development of the above-mentioned embodiments, it can also be provided that, before the contact of the carrier medium with the metallic fibers and/or threads of the cover layer, the particles are loaded into the carrier medium by pressing or sintering.

The carrier medium can generally also be applied or loaded by means of pouring, trickling or spraying onto or into the area of the metallic fibers and/or threads of the cover layer.

The invention also includes a process variant in the case of which the particles are provided in a powder form. Here also, the charging of the particles into the area of the metallic fibers and/or threads of the cover layer takes place in that, at least in the area of the metallic fibers and/or threads for the embedding of the particles therein, the cover layer is dipped into the particle powder or the particle powder flows through it. As an alternative, the particle powder can, for example, also simply be applied to the area of the metallic fibers and/or threads of the cover layer by pouring or trickling. A spraying of the area of the metallic fibers and/or threads of the cover layer with particle powder is also possible if, for example, compressed air is used as a transport medium for the particles.

In the case of the above-mentioned embodiments, the individual particles are then held in the area of the metallic fibers and/or threads in a mechanical or, for example, electrostatic manner. However, within the scope of the invention, other possibilities can also be considered so that, for example, the particles adhere to the metallic fibers and/or threads by the bonding characteristics of the particles or their surface.

Within the scope of the invention, there are numerous possible ways to connect the particles, completely or partially, with the metallic fibers and/or threads of the cover layer by means of the binder, the carrier medium, mechanical clamping, sintering or the HIP-process, for example.

According to a particularly preferred variant of the composite, a felt is produced from the metallic fibers and/or threads of the cover layer, before the particles are placed in it. As an alternative or in addition, for forming the area of the cover layer with the metallic fibers and/or threads, a mesh and/or woven structure can also be formed of them.

A preferred approach in the case of the process according to the invention for producing a composite body consists of saturating the at least one fiber layer of the substrate and the cover layer in the area of the metallic fibers and/or threads in zones with a binder.

In another preferred embodiment of the process, it is provided that a single binder is used for forming the substrate and the cover layer and for their connection. However, in principle, different binders can also be used at different layers in order to meet, as optimally as possible, the requirements of the fiber materials used and/or the required application-based characteristics of the composite and particularly of its cover layer.

In order to largely avoid shaping after-treatments, it is preferred that the saturating of the at least one fiber layer of the substrate and of the cover layer in the area of the metallic fibers and/or threads with the binder be carried out in a mold or in a mold cavity. If the intended use of a composite requires a surface treatment, it can be subjected, particularly, on the cover layer, however, subsequently or basically at any time, on its side facing away from the substrate, after the saturation of the at least one fiber layer of the substrate and of the cover layer in the area of the metallic fibers and/or threads with binder, and particularly after solidification of the latter, as provided according to another process variant.

Additional advantageous and embodiments of the invention will be appreciated by one skilled in the art.

In the following, the invention will be described in detail in the manner of an example for an illustration by means of embodiments with reference to the figures of the drawings.

DETAILED DESCRIPTION OF THE DRAWINGS AND EMBODIMENTS OF THE INVENTION

In the figures, the same parts, which have the same or a similar effect, are provided with the same reference numbers. The illustrations of the drawings individually and when considered in combination, easily show and explain to a person skilled in the art the embodiments of the invention, even if a concrete reference is not made to every figure.

Figure 1:
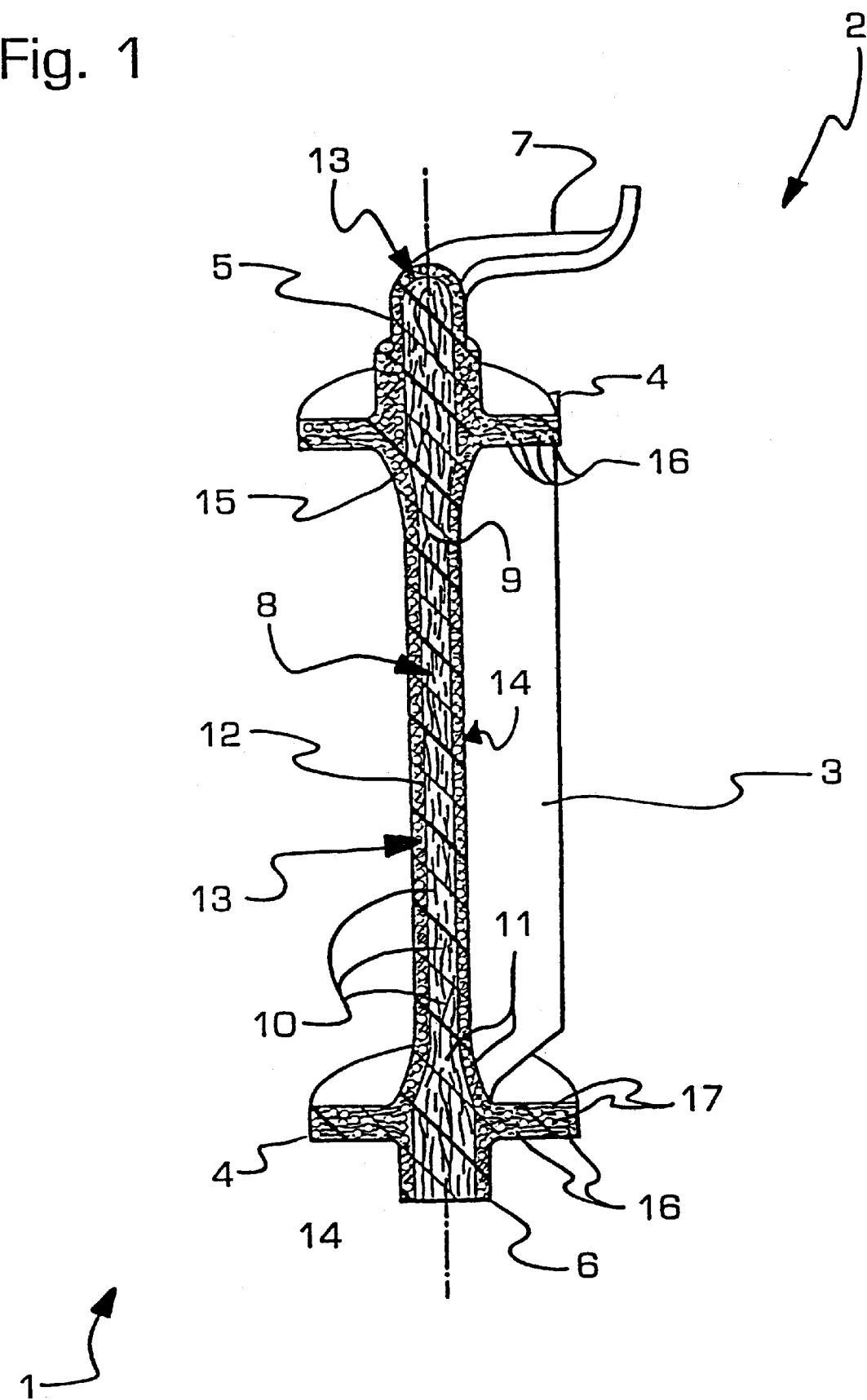
FIG. 1 is a schematic, partially cut, lateral view of a blade of a turbo-engine constructed of a composite.

FIG. 1 illustrates schematically, and in a partially cut manner, a guide blade 2, which is constructed of a composite 1, of a compressor which is not shown and which is used, for example, in the case of turbo-engines. The blade 2, which is continuously constructed as a composite 1, has a blade surface 3 and two bearing pins 5 and 6, which are situated on front edges opposed in the longitudinal dimension of the blade surface 3. An adjusting lever 7, which also has a layered construction, is also mounted on the bearing pin 5 illustrated on top in the drawing.

The composite 1 generally contains a substrate 8 which in principle and essentially determines the shape and size of the guide blade 2 with all shaped-out sections and attachments. The substrate 8 consists of a fiber-reinforced plastic material; that is, it contains layers 9 made of reinforcing fibers 10 and a binder 11. The binder 11 is a resin or synthetic resin which, after having been charged into the mesh of reinforcing fibers 10 or spread onto them, is hardened. However, other substances which can solidify can also be used as binders 11 only as a function of the characteristics which are to be achieved with respect to a component to be produced.

A cover layer 13 is applied to the full surface 12 of the substrate 8 and, in the case of the embodiment illustrated in FIG. 1, consists of a felt 14 made of nickel fibers of a porosity of approximately 95% in which particles 16 were embedded before the filling of the pores 15 of the cover layer 13 with the same binder 11 as the one used for the substrate 8. More precisely, the substrate 8 and the cover layer 13 were simultaneously in one working process or directly successively saturated with the binder 11 so that the latter, after its solidification, establishes a connection between the reinforcing fibers 10 of the substrate 8 and the metallic fibers and/or threads 17 of the cover layer 13 in the form of nickel fibers.

Figure 2:
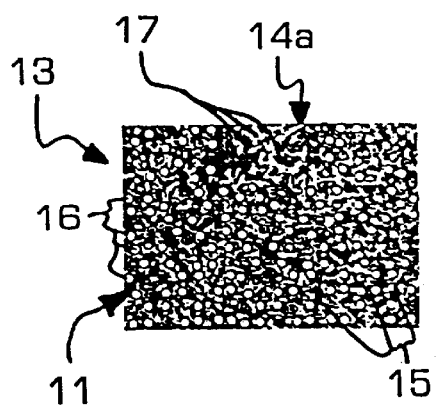
FIG. 2 is a schematic, enlarged view of a cover layer of a first embodiment of a felt of metallic fibers and/or threads with embedded particles.
Figure 3:
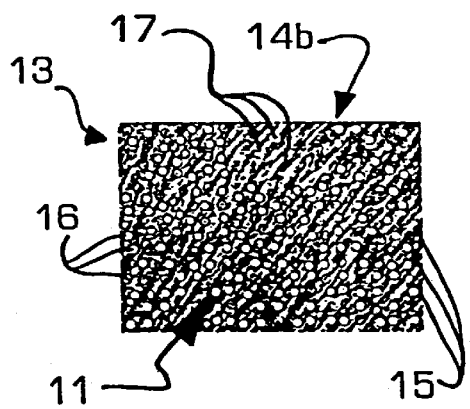
FIG. 3 is a schematic, enlarged view of a cover layer of a second embodiment of a felt made of metallic fibers and/or threads with embedded particles.
Figure 4:
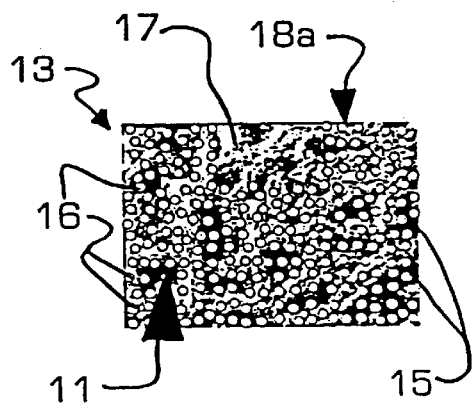
FIG. 4 is a schematic, enlarged view of a cover layer of a first embodiment of a woven structure or a mesh made of metallic fibers and/or threads with embedded particles.
Figure 5:
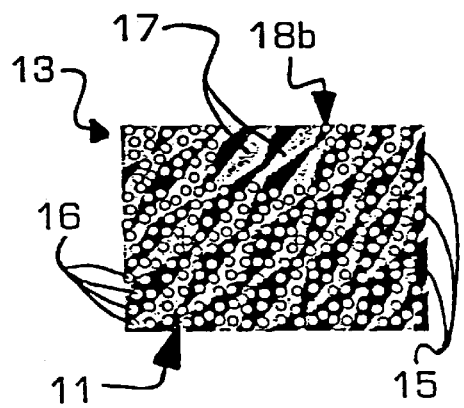
FIG. 5 is a schematic, enlarged view of a cover layer of a second embodiment of a woven structure or mesh made of metallic fibers and/or threads with embedded particles.
Figure 6:
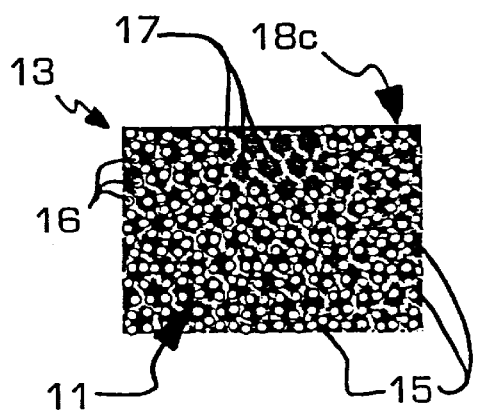
FIG. 6 is a schematic, enlarged view of a cover layer of a third embodiment of a woven structure or mesh made of metallic fibers and/or threads with embedded particles.
Figure 7:
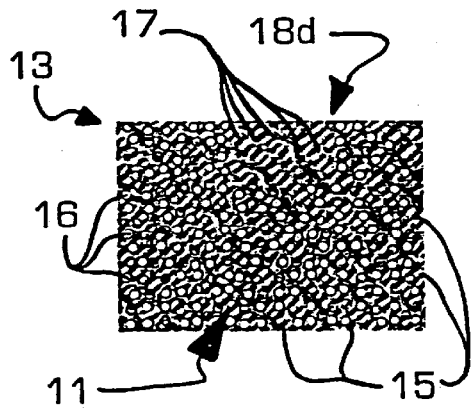
FIG. 7 is a schematic, enlarged view of a cover layer of a fourth embodiment of a woven structure or mesh made of metallic fibers and/or threads with embedded particles.

The substrate 8 need not necessarily have a single fiber layer 9 but may have a plurality of fiber layers 9. Each fiber layer 9 may have a felt-type, mesh-type and/or woven-type construction. The fibers 10 may, for example, be carbon fibers. The cover layer 13, which directly adjoins the exterior fiber layer 9, need not necessarily and completely be based on felt 14. As an alternative or in addition to the felt 14, other felt types 14a, 14b, for example, may be used which are schematically and in an enlarged manner, illustrated in FIGS. 2 and 3; or meshes or woven structures 18a, 18b, 18c, 18d may be used which, in principle and in an enlarged manner are illustrated in FIGS. 4 to 7. The substrate 8 as well as the cover layer 13 may also contain additional components (not shown)

The embedding of particles 16 in the area of the metallic fibers and/or threads 17 of the cover layer 13 improves its resistance to abrasion. In addition, by means of the added particles 16, for example, as another advantage, lower or higher coefficients of friction can be adjusted in connection with such a composite 1 depending on the application requirement. As a result of the metallic fibers and/or threads 17, the cover layer 13 has an electric conductivity which can be influenced by the selection and design of the metallic fibers and/or threads 17. Furthermore, the abrasive behavior of this composite 1 can be positively influenced by the construction of its cover layer 13. In particular, in comparison to the substrate, the cover layer may have a higher resistance to abrasion, a higher fire-proofing capacity and/or a higher electric conductivity.

Merely as a function of the planned usage-related demands on the composite 1 and/or the materials of the reinforcing fibers 10 of the substrate 8 and the metallic fibers and/or threads 17 of the cover layer 13, different binders can be used, particularly in layers.

According to the desired characteristics of the cover layer 13, metallic, ceramic and/or glass-type particles 16 can be used. In particular, the particles 16 may contain TiC, TiN, TiAl, Fe, steel, Ni, Si, metal alloys, diamond, glass and compounds therewith as well as combinations thereof. With respect to their structural shape and geometry, the particles 16 may be solid, porous or hollow.

In order to facilitate and optimize the charging or embedding of the particles 16 into the area of the metallic fibers and/or threads 17 of the cover layer 13, it is advantageous for the particles 16 to be components of a carrier medium which, however is not shown in the drawings. Such a carrier medium may be a solder compound, a metal filler, an adhesive agent, such as particularly a bonding agent, or a thermoplastic material.

The linking of the particles 16 to the metallic fibers and/or threads 17 of the cover layer 13 can take place, for example, individually or in combination with a binder 11, optionally the carrier medium, a mechanical clamping with the metallic fibers and/or threads 17 of the cover layer 13, a sintering or HIP-process with the metallic fibers and/or threads 17 of the cover layer 13.

In the following, a possibility for producing the composite 1 is indicated.

Particles 16 are embedded in the metal felt 14. This may take place, for example, by the filtering-out of the particles 16 from a liquid solution, such as ethanol.

So that the particles 16 are well distributed in the felt 14, 14a, 14b or in a mesh or woven structure 18a, 18b, 18c, 18d and optionally fastened, they can generally be made available in a pasty or liquid carrier medium.

Such a carrier medium may be a liquid solution, particularly an alcoholic or alcohol-like solution, such as the mentioned ethanol, and is then, before the saturation of the at least one fiber layer 9 of the substrate 8 and of the cover layer 13 in the area of the metallic fibers and/or threads 17 with the binder 11, removed while leaving particles 16 on the metallic fibers and/or threads 17 of the cover layer 13, which may be achieved by evaporating.

However, the embedding of the particles 16 can, for example, also be promoted by a zone-type saturating of the felt 14 by means of a solder (metal filler) or a thermoplastic material as the carrier medium into which the particles 16 were pressed or sintered. An adhesive agent, particularly a bonding agent, can also be used as such a carrier medium. Together with particles 16, this carrier medium remains during the saturation of the at least one fiber layer 9 of the substrate 8 and of the cover layer 13 in the area of the metallic fibers and/or threads 17 with the binder 11 on the metallic fibers and/or threads 17 of the cover layer 13 and thus forms an at least partial coating over the metallic fibers and/or threads 17 of the cover layer 13. For the later shaping process, it may be required that the carrier medium leaves the correspondingly treated cover layer 13 still moldable or adaptable by shaping.

Then the metallic particles 16 can be connected by sintering with the metallic fibers 17 of the metal felt 14. The felt 14 and the particles 16 are selected such that the combination still contains a porosity. During the laminating of the fiber composite component, for example, in the form of the guide blade 2, this porosity is filled with resin as the binder 11. As a result, the connection between the substrate 8 and the cover layer 13 is also simultaneously established. This cover layer 13, which acts as the protective layer, may also subsequently be applied to a component formed of a hardened substrate 8, particularly also for its repair.

In the case of another variant of the process for charging the particles 16 into the area of the metallic fibers and/or threads 17 of the cover layer 13, the particles 16 are provided in a powder form. Also in this case, the charging of the particles 16 into the area of the metallic fibers and/or threads 17 of the cover layer 13 takes place in that the latter, at least in the area of the metallic fibers and/or threads 17, for the embedding of the particles 16 therein is dipped into the particle powder or it flows through it. As an alternative, the particle powder may, for example, be applied to the area of the metallic fibers and/or threads 17 of the cover layer 13 simply by pouring or trickling. A spraying of the area of the metallic fibers and/or threads 17 of the cover layer 13 with the particle powder is also possible if, for example, compressed air is used as a transport medium for the particles 16. The individual particles 16 are then held in the area of the metallic fibers and/or threads 17, for example, mechanically or, for example, electrostatically or by adhesive characteristics of the particles 16 or their surface.

As mentioned above, for the charging or embedding of the particles 16 in the area of the metallic fibers and/or threads 17, the cover layer 13 is preferably dipped into the carrier medium or the particle powder or they flow through it. However, generally, the carrier medium can also be applied or charged by pouring, trickling or spraying the area of the metallic fibers and/or threads 17 of the cover layer 13.

However, the particles 16 are preferably embedded into the cover layer 13 in the area of the metallic fibers and/or threads 17 before the at least one fiber layer 9 of the substrate 8 and the cover layer 13 in the area of the metallic fibers and/or threads 17 are saturated with binder 11. However, generally, it is also possible to charge the particles 16 together with the binder 11 into the area of the metallic fibers and/or threads 17 of the cover layer 13. Thus, it is possible to connect the particles 16 completely or partially by means of the binder 11, optionally the carrier medium, a mechanical clamping, sintering or the HIP-process with the mechanical fibers and/or threads 17 of the cover layer 13.

The construction of the composite 1 may take place in a mold. After the solidifying of the binder 11 or binders, a surface treatment can be carried out. For example, a layer of particles 16 is placed on the bottom of a cast or on a surface of a mold part. A layer of metal felt 14 is placed in contact with the particles. Fiber layer 10 is then placed on the metal felt layer. A binder or binder composition 11 is then added onto the fiber layer and then infiltrates the whole structure, the particles and each layer. Generally, the molded product is set by elevating the temperature. Various changes can be made to accomodate different molding apparatus or conditions, as known in the art.

A composite 1, constructed or manufactured according to the invention or the above description, because of its cover layer 13 with the particles 16 and the felt 14, 14a, 14b, the mesh or woven structure 18a, 18b, 18c, 18d of metallic fibers and/or threads 17, has surfaces characteristics which cannot be achieved by the fiber composite substrate 8. These are, in particular, the resistance to abrasion which can be predetermined by the material and the structure in the cover layer 13; selectable low or high coefficients of friction, and an abrasive behavior which can be produced in a defined manner.

The linking of the particles 16 to the metallic fibers and/or threads 17 of the cover layer 13 takes place not only by the matrix resin formed by the binder 11 but optionally also, for example, by a mechanical clamping or jamming of the particles 16 between the metallic fibers and/or threads 17; in the case of a suitable metallic particle powder by sintering with the metallic fibers and/or threads 17 or by the HIP-process; by linking by means of a metallic solder and/or linking by means of a thermoplastic bonding agent.

Among others, a further advantage of the composite 1, because of its cover layer 13, consists of the fact that, because of the possible tolerances for machine tools, it can be machined more easily than in the case of a different construction of the composite 1.

In the following, several other applications or components will be specifically described only as examples on adjusting turbo-engine blades, in which the composite 1 can be used in an advantageous manner:

bearing points on the adjusting blades of the turbo-engines, including power units;

friction surfaces, as occur, for example, in the case of a dovetail design between the blade and a disk holding it; and grazing coatings between a housing and the blade on the blade tip and the housing surface situated opposite it.

Further examples of applications or components using the composite 1 are:

friction surfaces in the case of sealing rings, including piston rings, for fire proofing, such a titanium fire protection, in the bypass duct or in a compressor housing because of the change of the fire behavior of the composite 1 as a result of its cover layer 13;

as a protection against lightning because of the electric conductivity of the composite as a result of its cover layer 13;

contact surfaces under screwed and riveted connections (in this case, the plastic deformability and the corrosion protection play an important role because metal composites are endangered by corrosion);

piston shells, connecting rod bearings;

disk brakes, in which case, at this time, a low temperature stress of less than approximately 250° C. is used as a prerequisite which, however, depending on the material combinations in a corresponding composite 1 which are still to be tested, should not be understood as the absolute upper limit;

disk wheels for bicycles;

interior sides of pipe lines which transport abrasive media, such as drilling rinses in mining, crude oil, etc; and for the purpose of de-icing heatable edges, for example, at a power unit inlet.

The above description of embodiments of the composite and of the process for manufacturing a composite within the scope of the invention is used only for illustrating individual device and process characteristics. However, the invention is not limited to the concrete embodiments which are described particularly in connection with the drawings. The complete extent of the invention is determined particularly by the claims. Thus, although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An erosion resistant machinery component suitable for exposure to high speed fluid flow, said machinery component being made of a composite material, comprising:

a substrate comprising at least one fiber layer; and a cover layer forming a surface of said machinery component comprising metallic fibers or threads having particles of a metal, ceramic, or glass composition embedded therein; wherein the cover layer adjoins at least one fiber layer of the substrate; and the at least one fiber layer of the substrate and the metallic fibers or threads of the cover layer are saturated with at least one binder composition.

2. The machinery component made of a composite material according to claim 1, wherein the substrate comprises a plurality of fiber layers.

3. The machinery component made of a composite material of claim 2, wherein at least one fiber layer comprises one of a fiber-reinforced plastic material and non-metallic fibers.

4. The machinery component made of a composite material according to claim 1, wherein the cover layer consists essentially of the metallic fibers or threads with embedded particles, and the binder composition.

5. The machinery component made of a composite material according to claim 1, wherein the fiber layer of the substrate and the metallic fibers or threads of the cover layer are saturated and connected by means of the same binder.

6. The machinery component made of a composite material according to claim 1, wherein the binder comprises one of a resin and a synthetic resin.

7. The machinery component made of a composite material according to claim 1, wherein the metallic fibers or threads of the cover layer form one of a felt, a mesh, and a woven structure.

8. The machinery component made of a composite according to claim 1, wherein the particles comprise at least one of a metal composition, a ceramic composition and a glass composition.

9. The machinery component made of a composite material according to claim 1, wherein the particles contain at least one of the following: TiC, TiN, TiAl, Fe, steel, Ni, Si, metal alloys, diamond, glass and compounds therewith as well as combinations thereof.

10. The machinery component made of a composite material according to claim 1, wherein the particles are one of solid, porous and hollow.

11. The machinery component made of a composite material according to claim 1, wherein the particles are constituents of a carrier medium, which at least partially surrounds the metallic fibers or threads of the cover layer.

12. The machinery component made of a composite material according to claim 11, wherein the carrier medium is one of a solder compound, a metal filler, an adhesive agent, a bonding agent, and a thermoplastic material.

13. The machinery component made of a composite material according to claim 1, wherein the particles are completely or partially connected to the metallic fibers or threads of the cover layer by one of a binder composition, a carrier medium, mechanical clamping, sintering and an HIP-process.

14. The machinery component made of a composite material according to claim 1, wherein:

the substrate has several sides; and the cover layer is formed on more than one side of the substrate and essentially surrounds a substrate side formed thereon.

15. An article of manufacture comprising a composite material according to claim 1.

16. A process for manufacturing a composite material according to claim 1, comprising embedded metallic, ceramic, or glass-type particles in a cover layer; providing a substrate comprising at least one fiber layer comprising metallic fibers and/or threads; and saturating the at least one fiber layer of the substrate and the cover layer with at least one binder composition, thereby connecting the substrate to the cover layer.

17. A process for manufacturing a composite according to claim 16, wherein the particles are provided in a powder form, and wherein the cover layer is dipped into the particle powder or the particle powder flows through the cover layer in order to embed the particles.

18. A process for manufacturing a composite according to claim 16, wherein the particles are at least partially connected with the metallic fibers and/or threads of the cover layer by a binder, or by the carrier medium, or by mechanical clamping, or by sintering, or by an HIP-process.

19. A process for manufacturing a composite according to claims 16, wherein the metallic fibers and or threads (17)-therefore of the cover layer for a felt, a mesh and/or a woven structure before the particles are embedded therein.

20. A process for manufacturing a composite according to claim 16, wherein the saturation of the at least one fiber layer of the substrate and the cover layer with binder occurs in zones.

21. A process for manufacturing a composite according to claim 16, wherein a single uniform binder is used for the forming of the substrate and the cover layer and for their connection.

22. A process for manufacturing a composite according to claim 16, wherein the saturating of the at least one fiber layer of the substrate and of the cover layer occurs in the area of the metallic fibers and/or threads and takes place in a mold or in a mold cavity.

23. A process for manufacturing a composite according to claim 16, wherein the cover layer comprises more than one side and, on the side facing away from the substrate, the cover layer is subjected to a surface treatment.

24. A process for manufacturing a composite material according to claim 16, wherein the particles are in a pasty or liquid carrier medium, and wherein the embedding of particles in the cover layer is by dipping at least the area of the metallic fibers and/or threads of the cover layer into a carrier medium containing the particles or by flowing the carrier medium containing the particles through the cover layer.

25. A process for manufacturing a composite according to claim 24, wherein the carrier medium is a liquid solution, an alcoholic or alcohol-type solution, an ethanol solution, and wherein the carrier medium is removed before the saturating of the at least one fiber layer of the substrate and of the cover layer with binder, while leaving the particles on the metallic fibers and/or threads of the cover layer.

26. A process for manufacturing a composite according to claim 24, wherein the carrier medium is a solder composition, a metal filler, an adhesive agent, a bonding agent, or a thermoplastic material, and wherein the carrier medium containing the particles remains on the metallic fibers and/or threads (17)-therefore of the cover layer during the saturation of the at least one fiber layer of the substrate and of the cover layer.

27. A process for manufacturing a composite according to claim 26, wherein before the carrier medium contacts the metallic fibers and/or threads of the cover layer, the particles are brought into the carrier medium by pressing or sintering.

* * * * *